Dec. 12, 1967        W. B. JAMISON        3,357,495

METHOD OF EXTINGUISHING BURNING VOLATILE MATERIAL

Filed Aug. 10, 1965

INVENTOR
WILL B. JAMISON
BY *Ernest A. Jensen*
ATTORNEY

United States Patent Office

3,357,495
Patented Dec. 12, 1967

3,357,495
METHOD OF EXTINGUISHING BURNING
VOLATILE MATERIAL
Will B. Jamison, Wyckoff, N.J., assignor to Specialties
Development Corporation, Belleville, N.J., a corporation of New Jersey
Filed Aug. 10, 1965, Ser. No. 478,659
1 Claim. (Cl. 169—15)

ABSTRACT OF THE DISCLOSURE

Method of extinguishing burning volatile liquids by applying a layer of high expansion foam and thereafter superimposing water fog on the layer of foam.

---

One of the most difficult tasks is to extinguish burning volatile liquid confined in a space such as a dike or shallow pit surrounding a tank or vat wherein the liquid is being used for industrial purposes.

Recently, it has been found that high expansion foam is a highly effective medium for extinguishing fires. By high expansion foam is meant a foam which is produced by causing between about 100 to about 2000 volumes of air to produce a foam from one volume of an aqueous solution containing a foaming agent. Normally high expansion foam has an expansion ratio from 400 to 1 to 1200 to 1. Suitable apparatus for producing such a foam is disclosed in U.S. Patent 3,142,340, July 28, 1964.

In a number of carefully controlled tests, it was determined that when it was not possible to build up a sufficient depth of foam over a fire of a low flash point flammable liquid, the fire continued to burn beneath or within the foam. The foam was able to gain control of a fire of a low flash point flammable liquid when a limited depth of foam was placed upon the flammable liquid, but it was not possible to extinguish the fire. On the other hand, if the sides of the dike, pit or tank were high enough, the foam would build up a substantial depth and the fire would go out.

From these observations, it was determined that when the weight of the foam was equal to or greater than the vapor pressure of the flammable liquid, there recurred an interruption of the continuity of vapor emission, and the fire was extinguished.

The weight of the foam is inversely proportional to its ratio. Thus heavier foam can suppress a greater vapor pressure. But lighter foam is able to cover, control, and absorb the heat of a fire more quickly than the same volume of liquid made into heavier foam.

Accordingly, an object of the present invention is to provide an improved method of extinguishing a burning volatile flammable liquid.

Another object is to provide such a method which is particularly effective to extinguish burning volatile liquids having a relatively low flash point temperature and a relatively high vapor pressure at its flash point temperature.

A further object is to provide such a method which is simple, practical, economical and reliable.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, it was discovered that a fire of a low flash point flammable liquid confined in a space such as a dike, pit, trench or open tank could be extinguished by applying to the surface of the burning volatile liquid a layer of high expansion foam having a thickness sufficient to control the fire, and thereafter superimposing on the layer of foam sufficient water fog so that the combined weight of the foam and the water fog overcomes the vapor pressure of the volatile liquid to effect extinguishment of the fire.

Water fog is defined in Webster's Third New International Dictionary, 1965, as "a fine spray or fog formed by sending one high-pressure stream of water against another in the tip of a nozzle."

It was determined that such a fire can be fought most effectively by rapidly covering the flammable liquid with a high expansion foam made as light as possible but yet being able to stay in position when subjected to wind or convection currents.

It was further discovered that the water fog, in addition to adding weight to light high expansion foam, created a heavy layer of foam on top of the light foam which shielded the light foam against the tearing action of high winds or strong convection currents.

Figure 1:
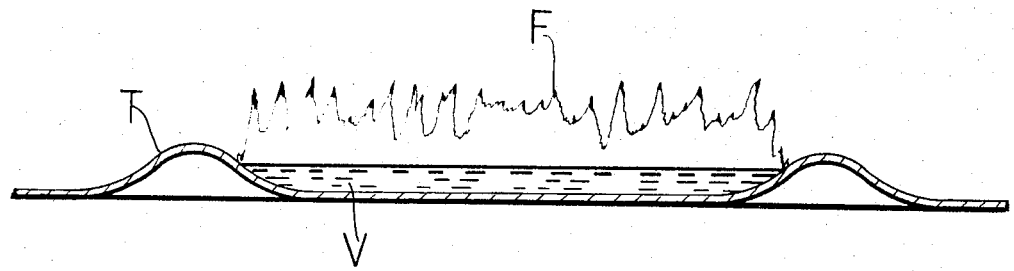
FIG. 1 is a schematic view of a dike wherein volatile material is confined which is burning at the surface thereof.

Referring now to FIG. 1 of the drawing in detail, there is shown a dike D containing a volatile material V such as gasoline which is burning at the surface thereof as indicated by the flames F.

Figure 2:
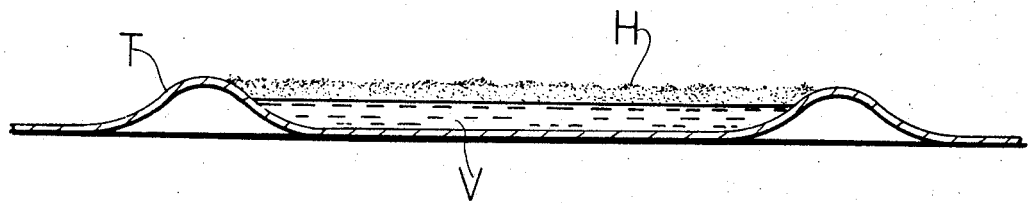
FIG. 2 is a schematic view of the dike shown in FIG. 1 after the application of a layer of high expansion foam.

In FIG. 2, a layer of high expansion foam H has been applied to the surface of the burning volatile material having a thickness sufficient to control the fire only.

Figure 3:
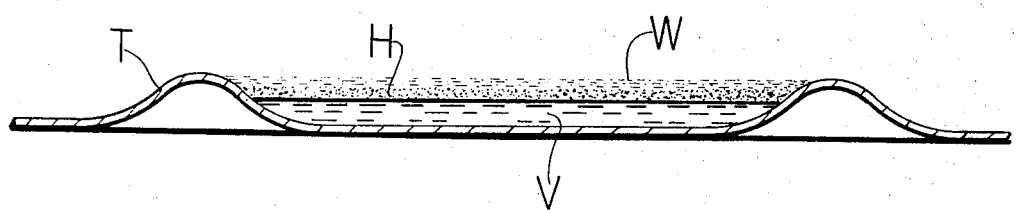
FIG. 3 is a showing after the water fog application.

In FIG. 3, conventional water fog W has been superimposed on the layer of foam H in an amount sufficient so that the combined weight of the foam H and the water fog W overcomes the vapor pressure of the volatile material to extinguish and prevent re-ignition thereof.

The concept of extinguishing a fire in the manner involves controlling the flame with the high expansion foam and thereafter weighing down the foam with water fog to interrupt the continuity of vapor emission to extinguish the fire. The water fog has been found very efficient to weight down the foam blanket because the water fog can be superimposed without substantially disturbing or opening the foam blanket.

The thickness of the foam blanket required varies with the intensity of the fire and the amount of water fog required depends on the vapor pressure of the volatile material at a given temperature. Hence, the amounts of foam and fog required are not predictable or subject to calculation, but depend on the conditions at the time of extinguishment of a particular volatile material.

As a specific example of the method in accordance with the present invention, a fire of aviation gasoline having an area of 10,000 sq. ft. after being permitted to burn for 30 seconds in a high wind was extinguished by first applying a 1000 to 1 foam blanket having a thickness of about thirty inches and thereafter superimposing an amount of conventional water fog containing about 100 gallons of water. The fire was extinguished in about a minute, and re-ignition thereof did not take place.

From the foregoing description, it will be seen that the present invention provides a highly effective method of extinguishing burning volatile material.

It will be understood that the details and examples hereinbefore set forth are illustrative only and that the invention as broadly described and claimed in no way is to be limited thereby.

I claim:

The method of extinguishing burning volatile liquid confined in a dike, pit, trench or open tank exposed to wind, which method comprises applying to the surface of the burning volatile liquid a layer of high expansion foam having an expansion ratio from about 100 to 1 to about 2000 to 1 and having a thickness sufficient to control the fire, and thereafter directly superimposing on the layer of foam sufficient water fog formed by sending one high-pressure stream of water against another in the tip of a nozzle so that the combined weight of the foam and the water fog creates a heavy layer of foam on top of light foam which shields the light foam and overcomes the vapor pressure of the volatile liquid and the foam is unaffected by wind and convection currents to thereby effect extinguishment of the fire.

References Cited

UNITED STATES PATENTS

| 1,455,789 | 5/1923 | Holmes | 169—4 |
| 3,142,340 | 7/1964 | Jamison | 169—15 |

FOREIGN PATENTS

| 912,658 | 5/1954 | Germany. |

EVERETT W. KIRBY, *Primary Examiner.*